No. 734,349. PATENTED JULY 21, 1903.
T. McCABE, Jr.
NUT LOCK.
APPLICATION FILED DEC. 6, 1902.
NO MODEL.
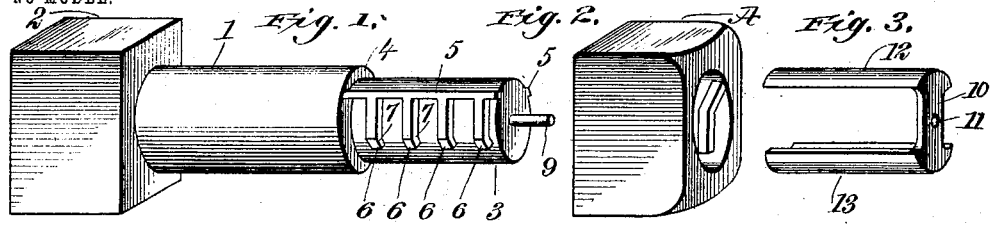
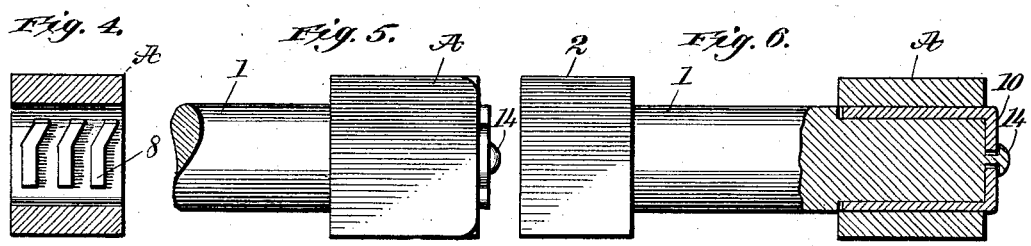
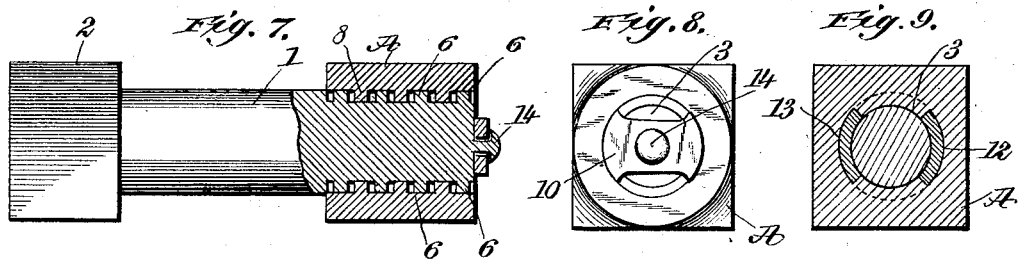
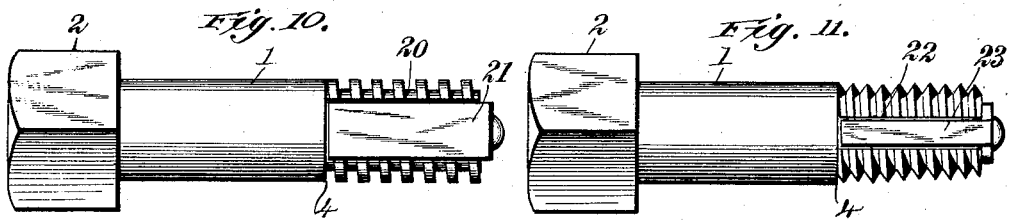
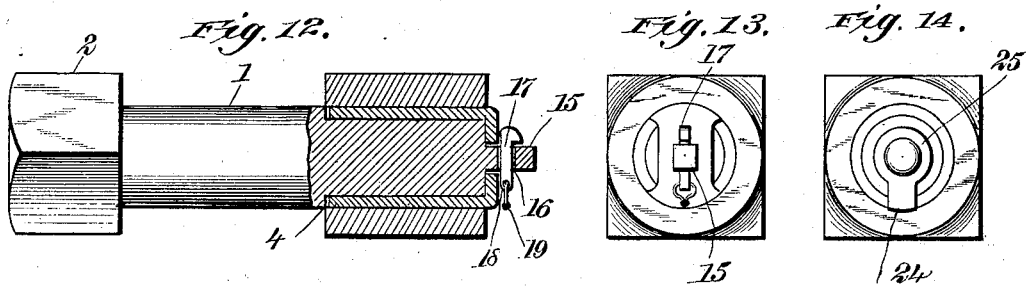
WITNESSES:
Paul Hunter
R. B. Cavanagh
INVENTOR
Thomas McCabe Jr.,
BY Munn & Co
ATTORNEYS.

No. 734,349.

Patented July 21, 1903.

UNITED STATES PATENT OFFICE.

THOMAS McCABE, JR., OF HOMESTEAD, PENNSYLVANIA.

NUT-LOCK.

SPECIFICATION forming part of Letters Patent No. 734,349, dated July 21, 1903.

Application filed December 6, 1902. Serial No. 134,127. (No model.)

*To all whom it may concern:*

Be it known that I, THOMAS MCCABE, Jr., a citizen of the United States, and a resident of Homestead, in the county of Allegheny and State of Pennsylvania, have invented new and useful Improvements in Nut-Locks, of which the following is a full, clear, and exact description.

The present invention relates to certain novel and useful improvements in nut-locks.

One of the principal objects of my invention is to provide a device of the character above specified which shall be simple in construction, positive in operation, durable, and at the same time capable of securely retaining a nut against movement, thus preventing said nut from "working off" or leaving the bolt.

I have also in contemplation the provision of an improved key which when employed in conjunction with the bolt or nut will greatly assist in attaining the above-recited object.

A further object of the invention is to so thread and groove the shank of the bolt and the interior of the nut that but a partial turn or revolution of the nut is all that is necessary to wedge or tighten the same against the bolt.

Still another object is to provide a pintle or seal for retaining the nut, bolt, and key in their assembled position.

With these and other objects of a similar nature in view my invention consists in the construction, combination, and arrangement of parts, as will be hereinafter described in this specification, delineated in the accompanying drawings, and set forth in the appended claims.

While I have shown and herein described one particular embodiment of my invention, I wish it to be understood that I do not limit myself to the precise details thereof, as there can be modifications and variations in some respects without departing from the spirit or scope of the invention or sacrificing any of the advantages thereof.

Reference is to be had to the accompanying drawings, forming a part of this specification, in which similar characters of reference indicate corresponding parts in all the figures.

Figure 1 is a perspective view of the bolt forming a part of my improved device. Fig. 2 is a similar view of the nut. Fig. 3 is a detail perspective view of my improved key. Fig. 4 is a sectional view showing the interior of the nut and the arrangement of the ribs or threads thereon. Fig. 5 is a side elevation of a portion of the device, showing the parts in their assembled position. Fig. 6 is a side view, partly in section and partly in elevation, showing the relative position of the various parts when assembled. Fig. 7 is a view similar to Fig. 6, but showing the interlocking of the threads or projections of the nut and bolt. Fig. 8 is a top plan view of the bolt, key, and nut when assembled. Fig. 9 is a horizontal sectional view of the structure illustrated in Fig. 8. Fig. 10 is a side elevation of another form of bolt and key. Fig. 11 is a view similar to Fig. 10 of another modification. Fig. 12 is a side view, partly in section, showing one manner of retaining the nut and key in position on the sleeve. Fig. 13 is a top plan view of the construction shown in Fig. 12. Fig. 14 is a top plan view of a modification showing the use of a single key; and Fig. 15 illustrates another method of arranging the ribs or projections on the shank of the bolt, the longitudinally-extending bead being omitted.

In the accompanying drawings, wherein is clearly shown an embodiment of my invention, 1 designates the main shank of a bolt, which is provided at one of its ends with a head or enlarged portion 2 of any desired shape, form, or character. The other end of the shank of the bolt is reduced, as at 3, preferably for a distance a little longer than the length of the nut to be applied thereto, a shoulder 4 being formed between the reduced portion 3 and the main shank 1. The aforesaid reduced portion is provided with a suitable number of longitudinally-extended ribs or beads 5 5, from which beads extend the projections 6, such projections not extending spirally circumferentially around the entire reduced portion of the shank, as is ordinarily the case in devices of this character, but being arranged parallel and extending a short distance around the circumference of the shank, such projections being beveled into angular form at their outer ends, as at 7. By this construction it will be seen that I provide two sets of relatively short parallel projections, the spaces between the aforesaid projections being adapted to seat corresponding lugs formed on the interior or bored-out portion of the nut A. These lugs, which I have shown at 8, are bent into angular form and are so arranged that when the nut is slipped upon the reduced shank portion of the bolt it is only necessary to give the nut a quarter turn or revolution and such lugs 8 will enter between the ribs or projections 6, thereby assisting in retaining the nut securely in position on the bolt. Formed on the end of the reduced shank portion is a pin or extension 9, adapted to accomplish a purpose hereinafter set forth.

In order to retain the nut snugly and securely upon the bolt, I employ a key of the character illustrated in Fig. 3, which key, it will be observed, consists of a flat face portion 10, having an aperture 11 approximately centrally thereof and two parallel arms or members 12 and 13 substantially semicircular, having their inner faces concaved or grooved, the construction being such that the key may be slipped or placed longitudinally on the reduced portion of the shank, one of the arms—for instance, that shown at 12—occupying the space between the ribs 5 5, the lower free end of the arms or members of the key abutting against the shoulder 4, formed on the bolt, and the pin or extension 9 passing through the aperture 11 in the key. When the nut has been placed in position on the bolt, it is only necessary to give such nut, as hereinbefore stated, a quarter-turn to cause the locking engagement between the ribs on the interior of the nut and the projections on the bolt. The end of the pin 9, which extends some distance beyond the face 10 of the key, may then be flattened or hammered to form the substantially rivet-like head portion 14, as shown in Figs. 5 and 6.

When my invention is used upon railway-tracks or in similar situations, where it is necessary to permanently retain the rails in position, the above structure is preferable; but when my device is to be employed in machine-shops and like places, where it is oftentimes necessary to remove a nut from the bolt, instead of employing the above structure, where it is necessary to chisel or cut off the flattened or rivet head from the extension 9, I prefer to form this pin or extension approximately rectangular in shape, as shown at 15 in Figs. 12 and 13, said extension being transversely bored, as at 16, to receive the locking-pin 17, which pin may have an orifice, as at 18, at its point or reduced portion to receive a locking-wire 19, to which wire may also be attached a seal, if desired. With this structure it is only necessary to cut the locking-wire, remove the pin, turn the nut one-quarter of a revolution, and separate the parts.

Although in my preferred form I have shown the projections or beads of the bolt and nut extending but a short distance around the circumference of the shank and the bore, respectively, I do not limit myself to such precise construction, but, if desired, may also apply my improvement to bolts of the character shown in Figs. 10 and 11. In Fig. 10 I have shown the threads with a relatively wide pitch, a passage-way 20 being cut through the threads longitudinally of the bolt to receive the locking-key 21. In Fig. 11 I have shown an ordinary spirally-threaded nut which is also provided with a passage-way 22 for the reception of the key 23. It is also to be noted that instead of employing the key shown in Fig. 3—that is, one having two arms or members—I may use a key of the character shown in Fig. 14, such key being provided with but one member or arm, and its outer end, as at 24, is formed with a relatively wider part, as at 25, apertured for the reception of the pin on the shank of the bolt.

It will be observed that in the present invention I have devised a nut-lock which is exceedingly simple in its character and one which when the parts are fastened presents but little liability of derangement or damage from accidents or wear and tear, and my improved nut-lock may be manufactured in large quantities at but little expense. There are also numerous other advantages incident to my invention; but they will immediately suggest themselves to those skilled in the art to which the invention appertains, so it is unnecessary to dwell upon the same in detail.

In Fig. 15 I have shown the longitudinal bead omitted from the shank of the bolt, thus facilitating and cheapening the manufacture of the same by machinery.

Having thus described my invention, I claim as new and desire to secure by Letters Patent—

1. A nut-lock, comprising a bolt having a reduced shank portion, projections extending partially around said shank portion, a rib extending longitudinally of the reduced shank portion, a pin formed integral with the end of the shank, a key having two concaved arms connected by an apertured flat portion, the arms being adapted to fit over the reduced shank portion, the pin at the end of the shank extending through the aperture of the flat portion, and a nut for said bolt, substantially as set forth.

2. A nut-lock, comprising a bolt having a shank formed of an enlarged portion and a reduced portion, a shoulder being formed at the juncture of the two portions, a pin formed integral with the end of the reduced portion, projections extending partially around the circumference of the reduced portion, a key having an aperture therein adapted to fit over said reduced portion of the shank, and a nut circularly bored and having ribs or lugs spaced apart, extending partially around the circumference of the bore, said nut being adapted to fit over the reduced portion of the shank in such manner that a partial revolution of the same will bring the ribs or lugs of the nut into partial locking engagement with the projections of the bolts, substantially as set forth.

3. A nut-lock comprising a bolt, projections extending partially around the circumference of the shank of said bolt, a pin formed integral with the end of the bolt, a key comprising a face portion, and concaved arms or members depending from said face portion, adapted to fit over said shank, the face of said key being apertured to permit the passage therethrough of the pin of the shank, a nut having lugs or ribs extending partially around the bore thereof, adapted to be placed on said bolt, such ribs or lugs making locking engagement with the projection of the bolt, and means carried by the portion of the pin extending beyond the face of the key for securing the key in said shank, substantially as set forth.

4. A nut-lock comprising a bolt having projections formed partially around the shank thereof, a pin at the end of said shank, a key formed of a face portion and depending concaved arms or members adapted to fit over said shank, said key having an aperture in its face portion to permit the passage therethrough of the pin on the shank, a bolt having ribs or lugs formed partially around the walls of the bored-out portion, the structure being such that when the nut is in position on the shank a partial revolution will cause an interlocking engagement between said nut and bolt, and a locking-pin extending through the portion of the pin on the shank, said locking-pin having an orifice at one end to receive a fastening means, substantially as set forth.

In testimony whereof I have signed my name to this specification in the presence of two subscribing witnesses.

THOMAS McCABE, Jr.

Witnesses:
 DAVID LYNCH,
 JOHN B. JONES, Jr.